US011958355B2

(12) United States Patent
Kinouchi et al.

(10) Patent No.: US 11,958,355 B2
(45) Date of Patent: *Apr. 16, 2024

(54) ACCELERATOR PEDAL SYSTEM (71) Applicant: DENSO CORPORATION, Kariya (JP)

(72) Inventors: Soichi Kinouchi, Kariya (JP); Yuusuke Yoshida, Kariya (JP); Takuto Kita, Kariya (JP); Hideyuki Mori, Kariya (JP); Shinji Komatsu, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,801

(22) Filed: Aug. 23, 2022

(65) Prior Publication Data
US 2023/0060925 A1 Mar. 2, 2023

(30) Foreign Application Priority Data

Aug. 25, 2021 (JP) .................... 2021-137423

(51) Int. Cl.
B60K 26/02 (2006.01)
G05G 1/44 (2008.04)
(Continued)

(52) U.S. Cl.
CPC ............ B60K 26/02 (2013.01); G05G 1/44 (2013.01); G05G 5/005 (2013.01); G05G 5/03 (2013.01);
(Continued)

(58) Field of Classification Search
CPC ............ G05G 1/30; G05G 1/40; G05G 1/405; G05G 1/38; G05G 1/44; G05G 5/005;
(Continued)

(56) References Cited

U.S. PATENT DOCUMENTS

2011/0125367 A1* 5/2011 Sakaguchi ........... B60K 26/021
701/36
2017/0217312 A1* 8/2017 Schweinfurth ......... F02D 11/02
(Continued)

FOREIGN PATENT DOCUMENTS

EP 2196348 A1 * 6/2010 ........... B60K 26/021
JP 2004-60484 2/2004
(Continued)

OTHER PUBLICATIONS

Machine Translation of EP-2196348-A1.*
(Continued)

Primary Examiner — Vinh Luong
(74) Attorney, Agent, or Firm — Nixon & Vanderhye P.C.

(57) ABSTRACT

An accelerator pedal system includes a pedal lever, a lock mechanism, an actuator, and an ECU. The pedal lever operates according to a step-on operation. The lock mechanism can restrict an operation of the pedal lever. The actuator switches between a locked state in which the operation of the pedal lever is restricted by the lock mechanism and an unlocked state in which the operation of the pedal lever is not restricted. The ECU includes a lock operation determination unit and an actuator control unit. The lock operation determination unit unlocks the pedal lever when an approaching object from behind is detected during a travel of a vehicle in the locked state.

11 Claims, 8 Drawing Sheets (51) Int. Cl.
*G05G 5/00* (2006.01)
*G05G 5/03* (2008.04)
*B60Q 9/00* (2006.01)

(52) U.S. Cl.
CPC ...... *B60K 26/021* (2013.01); *B60K 2026/023* (2013.01); *B60Q 9/00* (2013.01); *G05G 2505/00* (2013.01)

(58) Field of Classification Search
CPC .. G05G 5/03; G05G 5/05; G05G 5/28; G05G 2505/00; G05G 1/60; B60K 26/02; B60K 26/021; B60K 2026/023; B60K 2026/022; B60K 2026/026; B60K 28/02; B60W 30/14; B60W 30/143; B60W 50/16; B60W 2540/10; B60Q 9/00
See application file for complete search history.

(56) References Cited

U.S. PATENT DOCUMENTS

| | | | |
|---|---|---|---|
| 2017/0334458 A1* | 11/2017 | Sato | B60W 60/0059 |
| 2019/0322172 A1* | 10/2019 | O Meachair | B60W 30/143 |
| 2020/0114911 A1* | 4/2020 | Mitsuhashi | B60W 40/04 |
| 2020/0207212 A1* | 7/2020 | Yoshida | B60W 30/16 |
| 2020/0254906 A1* | 8/2020 | Luchner | B60K 35/00 |
| 2023/0001789 A1* | 1/2023 | Kita | B60K 28/10 |

FOREIGN PATENT DOCUMENTS

| | | | | |
|---|---|---|---|---|
| WO | WO 2017147727 A1 * | 9/2017 | | B60T 7/06 |
| WO | WO 2022059542 A1 * | 3/2022 | | B60K 26/02 |

OTHER PUBLICATIONS

Machine translation of WO 2017147727 A1, Xiao, Sep. 8, 2017 (Year: 2017).*
Translation of WO 2022059542A1, Yoshida et al., Mar. 24, 2022 (Year: 2022).*
U.S. Appl. No. 17/893,618 to Yuusuke Yoshida, filed Aug. 23, 2022 (25 pages).
U.S. Appl. No. 17/893,668 to Yuusuke Yoshida, filed Aug. 23, 2022 (22 pages).
U.S. Appl. No. 17/893,637 to Yuusuke Yoshida, filed Aug. 23, 2022 (34 pages).
U.S. Appl. No. 17/893,700 to Soichi Kinouchi, filed Aug. 23, 2022 (24 pages).
U.S. Appl. No. 17/893,752 to Soichi Kinouchi, filed Aug. 23, 2022 (22 pages).
U.S. Appl. No. 17/893,842 to Soichi Kinouchi, filed Aug. 23, 2022 (33 pages).
U.S. Appl. No. 17/893,883 to Soichi Kinouchi, filed Aug. 23, 2022 (28 pages).

* cited by examiner

ACCELERATOR PEDAL SYSTEM

CROSS REFERENCE TO RELATED APPLICATION

The present application is based on and claims the benefit of priority of Japanese Patent Application No. 2021-137423, filed on Aug. 25, 2021, the disclosure of which is incorporated herein by reference.

TECHNICAL FIELD

The present disclosure generally relates to an accelerator pedal system for a vehicle.

BACKGROUND

Conventionally, there is known a vehicle travel control device in which a reaction force against stepping on a pedal is increased so as to make an accelerator pedal function as a footrest. For example, a request for switching from an ON time to an OFF time of an auto speed control device (ASCD) is detected by a stepping pressure of the accelerator pedal or by an opening degree of an accelerator.

When a request for switching ON/OFF of the auto speed control device is detected according to the stepping pressure, a sensor for detecting such a pressure is required, and the structure becomes complicated. Further, when a request for switching ON/OFF of the auto speed control device is detected according to the opening degree of the pedal, it is necessary for letting a driver to step on the accelerator pedal for such switching, thereby a holding force for holding the accelerator pedal to serve as a footrest cannot be set large. Further, if an unlocking (i.e., lock releasing) is delayed when the other vehicle is overtaking from behind, a smooth acceleration may be restricted.

SUMMARY

It is an object of the present disclosure to provide an accelerator pedal system capable of appropriately controlling a locking state of an accelerator pedal.

An accelerator pedal system for a vehicle according to an aspect of the present disclosure includes a pedal lever, a lock mechanism, an actuator, and a controller. The pedal lever operates in accordance with a step-on operation. The lock mechanism can restrict the operation of the pedal lever. The actuator switches between a locked state in which the operation of the pedal lever is restricted by the lock mechanism and an unlocked state in which the operation of the pedal lever is not restricted.

The controller may include a lock operation determination unit and an actuator control unit. The lock operation determination unit determines switching of the locked state and the unlocked state by the lock mechanism. The actuator control unit controls a drive of the actuator. The lock operation determination unit releases the locked state of the pedal lever when an approaching object from behind the vehicle is detected while the vehicle is traveling in the locked state. In such manner, the locked state of the pedal lever is appropriately controllable.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Embodiments

Figure 1:
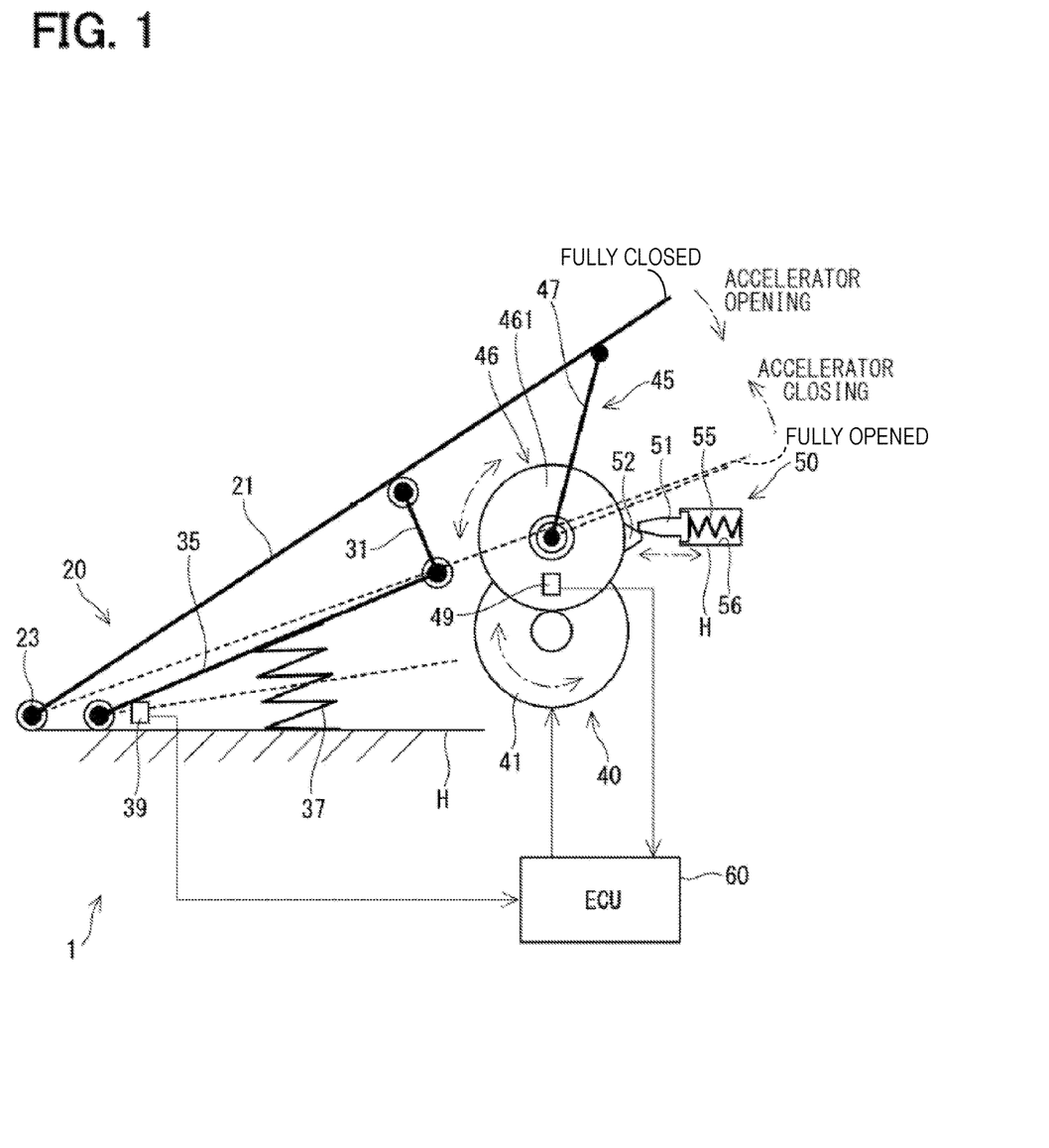
FIG. 1 is a schematic diagram illustrating an accelerator pedal system according to an embodiment.

Hereinafter, an accelerator pedal system according to the present disclosure will be described with reference to the drawings. An embodiment is illustrated in FIGS. 1 to 8. As illustrated in FIG. 1, an accelerator pedal system 1 includes a pedal lever 20, an actuator 40, a power transmission mechanism 45, a lock mechanism 50, an electronic control unit (ECU) 60 serving as a controller, and the like.

The pedal lever 20 includes a pad 21, an arm 31, and a pedal 35, and is integrally driven by a driver's step-on operation or the like. The pad 21 is provided operable by a driver's step-on operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by driving of a motor 41 or a step-on operation of the pedal lever 20 are collectively referred to as a "housing H".

The arm 31 couples between the pad 21 and the pedal 35. One end of the pedal 35 is rotatably supported by the housing H, and the other end is connected to the arm 31. With this arrangement, the pad 21, the arm 31, and the pedal 35 are integrally driven by an operation of the pad 21 by the driver. A pedal opening degree sensor 39 that detects a pedal opening degree $\theta$ is provided on one end side of the pedal 35.

Figure 2:
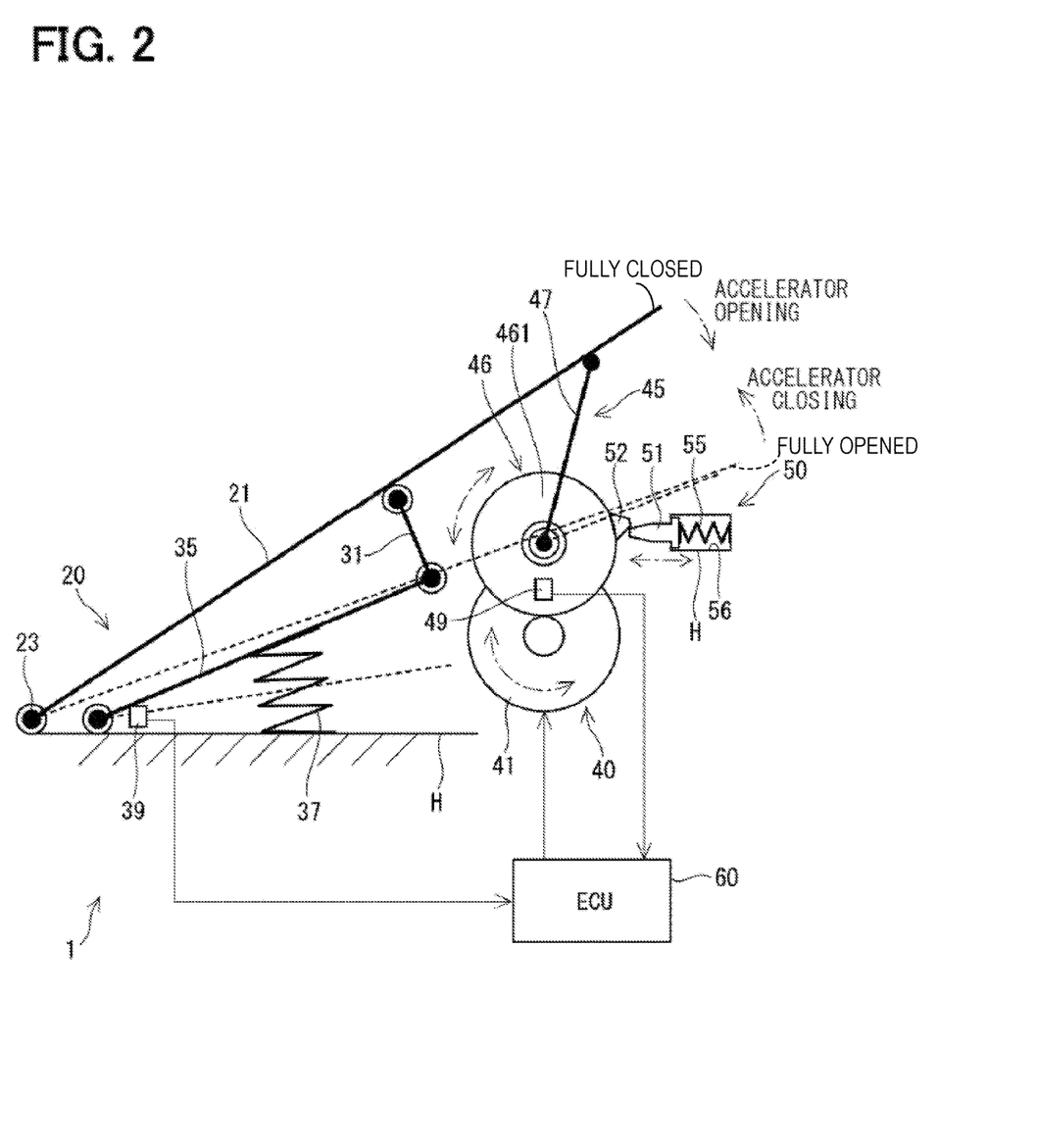
FIG. 2 is a schematic diagram illustrating a state where a pedal lever is locked in the accelerator pedal system according to the embodiment.

A pedal biasing member 37 is a compression coil spring and biases the pedal 35 in an accelerator closing direction, with one end fixed to the pedal 35 and the other end fixed to the housing H. In FIGS. 1 and 2, the solid lines depict a state of fully closed acceleration, and the broken lines depict a state of fully opened acceleration.

The actuator 40 includes the motor 41 and a power transmission mechanism 45. The motor 41 is, for example, a DC motor, and driving of the motor 41 is controlled by the ECU 60. The driving force of the motor 41 is transmitted to the pedal lever 20 via the power transmission mechanism 45.

It can be said that the actuator 40 is a series of components that transmits power from the motor 41 as a drive source to the pedal lever 20 via the power transmission mechanism 45.

The power transmission mechanism 45 includes a gear set 46, a power transmission member 47, and the like. The gear set 46 is configured with: a motor gear that rotates integrally with a motor shaft; and a plurality of gears that mesh with the motor gear, and the gear set 46 transmits the driving force of the motor 41 to the power transmission member 47. The gear set 46 includes a gear 461 that is provided with a locked portion 52 to be locked as described later. The gear 461 is provided with a position sensor 49 that detects a rotational position. Hereinafter, the rotational directions of the motor 41, the gear 461, and the like when the gear 461 is rotated counterclockwise on the paper surface are defined as positive, and the rotational directions of the motor 41, the gear 461, and the like when the gear 461 is rotated clockwise on the paper surface are defined as negative.

The power transmission member 47 is, for example, a cam, and one end side of the power transmission member 47 meshes with the gear set 46, so that the power transmission member 47 is rotationally driven by driving of the motor 41. The other end side of the power transmission member 47 is in contact with the pedal lever 20. With this arrangement, the driving force of the motor 41 is transmitted to the pedal lever 20. In FIG. 1, the other end of the power transmission member 47 is in contact with the pad 21, but may be in contact with the arm 31 or the pedal 35.

By rotating the motor 41 in the positive direction in a state where the power transmission member 47 and the pedal lever 20 are in contact with each other, it is possible to apply a reaction force in a push-back direction to the pedal lever 20. In addition, when no reaction force is applied to the pedal lever 20, it is desirable to rotate the motor 41 in the negative direction and thereby to retract the power transmission member 47 so that the pedal lever 20 and the power transmission member 47 will not be in contact with each other in the entire range from the fully closed state to the fully opened state of the pedal lever 20. Therefore, when no reaction force is applied, it is possible to prevent a cogging torque or the like from the power transmission mechanism 45 side from affecting a pedal force.

By applying a reaction force in the push-back direction to the pedal lever 20 by the motor 41, for example, by applying a reaction force to provide a sense of wall when a fuel consumption is determined, on the basis of the driving situation, to be deteriorated if the pad 21 is stepped on, the stepping on of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The lock mechanism 50 includes a locking member 51, a locked portion 52 to be locked, a resilient member 55, and the like. The locking member 51 has a tapered surface formed on one end side of the locking member 51 and is disposed such that the tapered surface is in contact with the locked portion 52. The other end side of the locking member 51 is accommodated in an accommodation chamber 56 formed on the housing H and is provided to be reciprocally movable in the axial direction. The locked portion 52 is provided to protrude from the gear 461 constituting the gear set 46, and rotates integrally with the gear 461. The locked portion 52 comes into contact with the locking member 51 on the tapered surface.

The resilient member 55 is accommodated in the accommodation chamber 56 provided on the housing H. One end of the resilient member 55 is in contact with the locking member 51, and the other end is engaged with the housing H, whereby the resilient member 55 biases the locking member 51 toward the locked portion 52.

FIG. 1 illustrates a state when locking is just started. When the gear 461 is rotated counterclockwise on the paper surface by the driving force of the motor 41 in a state where the locked portion 52 and the locking member 51 are in contact with each other, the locked portion 52 pushes the locking member 51 and thereby compresses the resilient member 55. When the gear 461 is further rotated counterclockwise and the locked portion 52 goes over and gets around the locking member 51 to the upper side on the paper surface, the locking member 51 returns to an initial position by a biasing force of the resilient member 55.

As illustrated in FIG. 2, in a locked state, since the locking member 51 latches the locked portion 52 by the biasing force of the resilient member 55, the rotation of the gear 461 is restricted. In addition, the power transmission member 47 functions as a locking force transmission member, so that the operation of the pedal lever 20 is restricted. As a result, the operation of the pedal lever 20 can be restricted in a non-energized state in which the energization of the motor 41 is turned off.

Hereinafter, to restrict the operation of the pedal lever 20 is simply referred to as "to lock". For example, during automatic driving or the like, it is possible to secure comfort by locking the pedal lever 20 and by thus making the pad 21 function as a footrest. In the present embodiment, the description is given, assuming that the pedal lever 20 is locked at a fully closed position.

When the gear 461 is rotated clockwise on the paper surface from the locked state illustrated in FIG. 2 by the driving force of the motor 41, the locked portion 52 pushes the locking member 51, so that the resilient member 55 is compressed. When the locked portion 52 goes over and gets around the locking member 51 to the lower side on the paper surface, the locked state is released, so that the locking member 51 returns to the initial position by the biasing force of the resilient member 55. Also, when a predetermined pedal force or more pedal force is applied to the pedal lever 20, the locked state can be similarly released.

Figure 9:
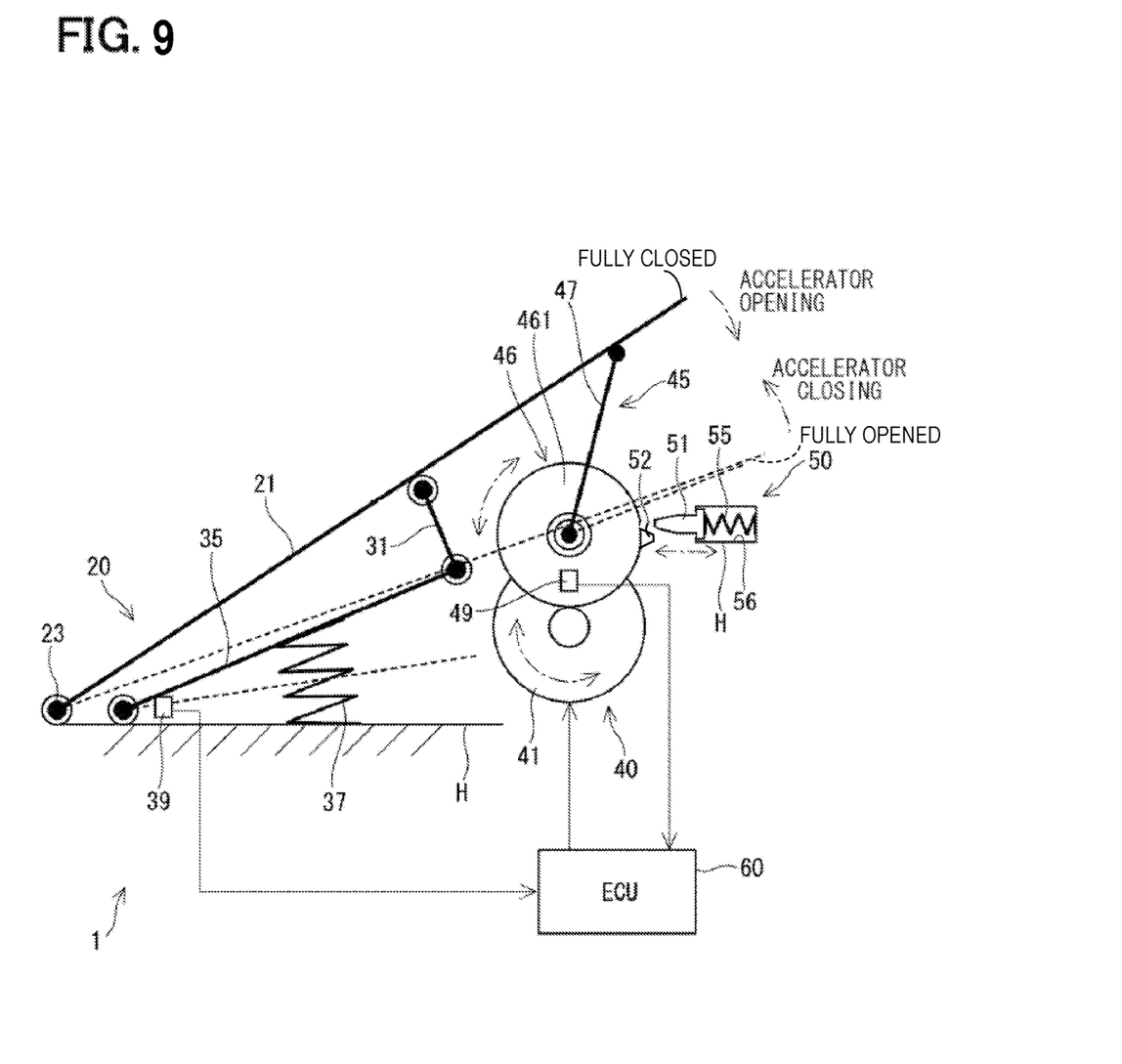
FIG. 9 is a schematic diagram illustrating a state where a pedal lever is unlocked in the accelerator pedal system according to the embodiment.

When the pedal lever 20 is kept unlocked, it is desirable to further rotate the gear 461 clockwise from the state illustrated in FIG. 1 to retract the locked portion 52 so that the locking member 51 and the locked portion 52 will not come into contact with each other as shown in FIG. 9.

Figure 3:
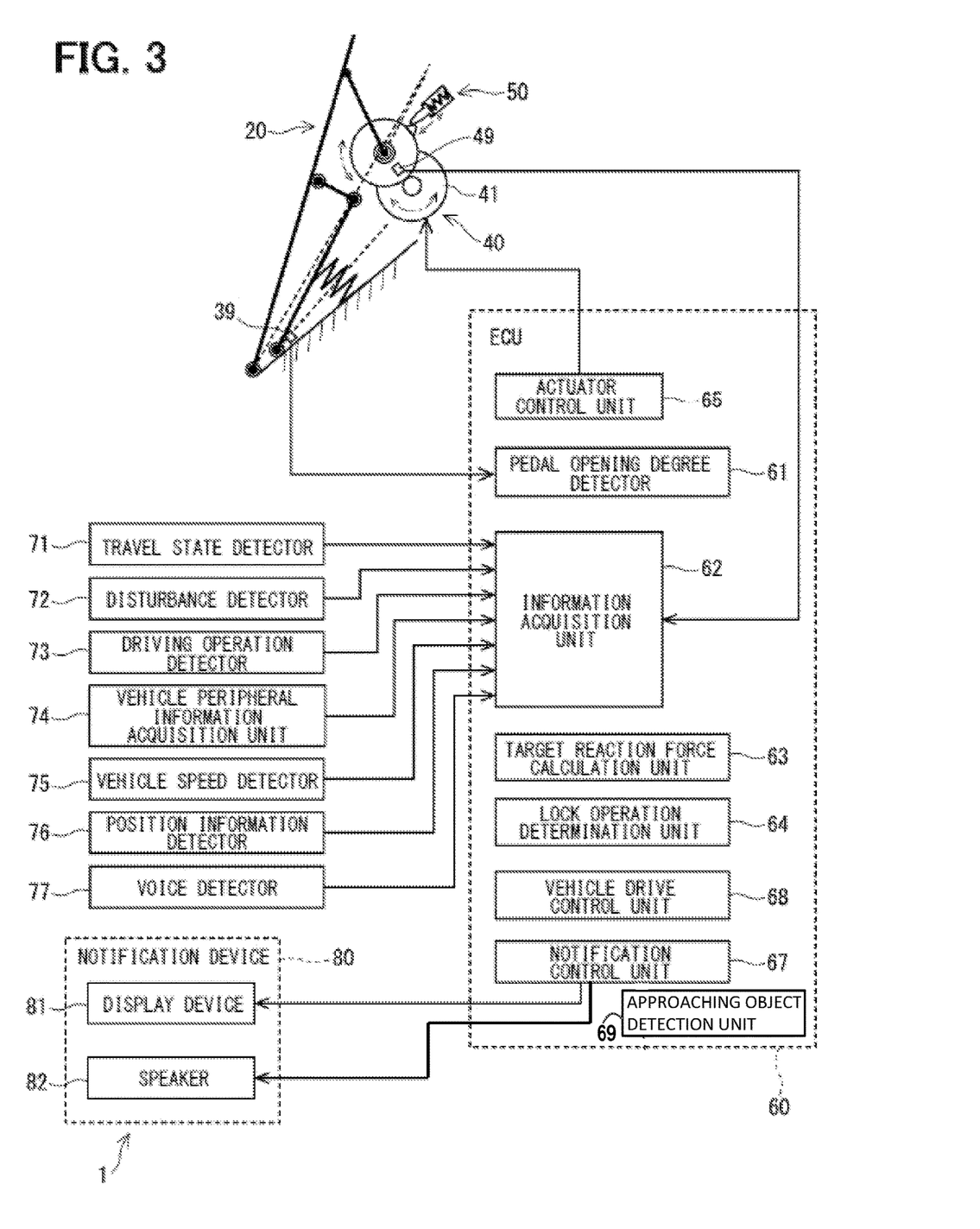
FIG. 3 is a block diagram illustrating a control configuration of the accelerator pedal system according to the embodiment.

As illustrated in FIG. 3, the ECU 60 is mainly configured with a microcomputer or the like, and includes therein: a central process unit (CPU), a read-only memory (ROM), a random-access memory (RAM), an input/output interface (I/O), which are all not illustrated; a bus line that connects these components; and other components. Processes in the ECU 60 may be realized by software process that is performed by the CPU executing a program previously stored in a physical memory device such as a ROM or the like (that is, a readable non-transitory tangible recording medium), and the processes may be realized by hardware process performed by a dedicated electronic circuit.

The ECU 60 includes, as functional blocks: a pedal opening degree detector 61; an information acquisition unit 62; a target reaction force calculation unit 63; a lock operation determination unit 64; an actuator control unit 65; a notification control unit 67; a vehicle drive control unit 68; an approaching object detection unit 69; and the like.

Although the ECU 60 is depicted as a single ECU 60 in FIG. 3, some of the functions may be configured with a separate ECU or the like.

The pedal opening degree detector 61 detects the pedal opening degree θ on the basis of a detection value of the pedal opening degree sensor 39. The information acquisition unit 62 acquires various types of information from the following components: the position sensor 49, a travel state detector 71, a disturbance detector 72, a driving operation detector 73, a vehicle peripheral information acquisition unit 74, a vehicle speed detector 75, a position information detector 76, a voice detector 77, and the like.

The target reaction force calculation unit 63 calculates a target reaction force to be applied to the pedal lever 20. On the basis of various types of information acquired by the information acquisition unit 62, the lock operation determination unit 64 makes a determination related to switching between a locked state in which the pedal lever 20 is locked and an unlocked state in which the pedal lever 20 is not locked. Hereinafter, as appropriate, switching from the unlocked state to the locked state may be referred to as "lock activation", and switching from the locked state to the unlocked state may be referred to as "lock releasing". The actuator control unit 65 controls driving of the motor 41 on the basis of the target reaction force, a determination result of the lock operation determination unit 64, and the like.

The notification control unit 67 notifies the notification device 80 of information that the driver is to be notified of. In the present embodiment, information related to lock activation and lock releasing of the pedal lever 20 is notified of. The vehicle drive control unit 68 controls driving of the vehicle.

The travel state detector 71 detects a driving mode as a traveling state. The driving mode includes an override mode in addition to an automatic driving mode and a manual driving mode. The control in the automatic driving mode is a cruise control such as an adaptive cruise control (ACC), but details of the control does not matter. In the override mode, both an input from the control by the automatic driving and a step-on input from the driver are input, and the input by the step-on operation of the driver is always prioritized in the override mode.

The disturbance detector 72 detects a disturbance on the basis of information of a G sensor that detects acceleration, a suspension behavior detection device, a room camera, and the like. The disturbance includes, for example, a deceleration G caused by a relatively rapid deceleration, a vehicle vibration caused by a stepped road surface and the like. Further, the disturbance may include non-driving-operation motions that are motions other than normal driving motions, for example, reseating of the driver, wearing and removing the seat belt, picking up a fallen object, stretching, and a driver's state of consciousness.

The driving operation detector 73 detects a turn signal operation and a steering wheel manipulation by the driver. The vehicle peripheral information acquisition unit 74 detects oncoming/approaching other vehicle 200 (see FIG. 4), obstacles, and the like by road-to-vehicle communication, vehicle-to-vehicle communication, an onboard camera, a radar, and the like.

The vehicle speed detector 75 detects a vehicle speed, which is a traveling speed of the vehicle. The vehicle speed detector 75 does not have to use a vehicle speed sensor, and may be configured to detect the vehicle speed by performing calculation using positional data of the global positioning system (GPS). The position information detector 76 detects the current position of the vehicle on the basis of information from map information, the GPS, road-to-vehicle communication, an onboard camera, and the like. The position information detector 76 may use the above-described types of information alone or in combination. In addition, information other than the above-described information may be used.

The voice detector 77 detects a voice emitted by an occupant. The notification device 80 includes: a display device 81, which is a display or the like; and a speaker 82, and notifies the driver of various types of information.

When (i) the vehicle is traveling by an automatic driving control such as an inter-vehicle distance control and (ii) the driver's stepping pressure is detected for unlocking from a state where the pedal lever 20 is locked, a sensor for detecting a pressure needs to be used. Further, when the unlocking is performed after the driver's pedal operation is detected, a start of an acceleration in an emergency situation may be delayed.

Figure 4:
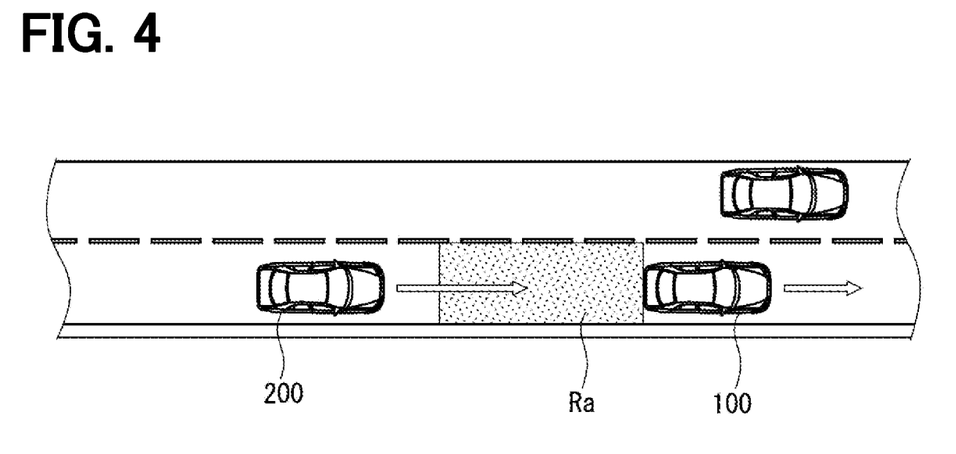
FIG. 4 is a diagram showing a proximity determination range according to the embodiment.

Therefore, in the present embodiment, the pedal is unlocked, that is, the pedal lock is released, based on peripheral information of the vehicle. Specifically, as shown in FIG. 4, for a purpose of allowing an acceleration of an own vehicle 100 for reserving an inter-vehicle to the other vehicle 200 when the other vehicle 200 is approaching to the own vehicle 100 from behind, the pedal is unlocked when the other vehicle 200 that is an approaching object is detected in a proximity determination range Ra.

Figure 5:
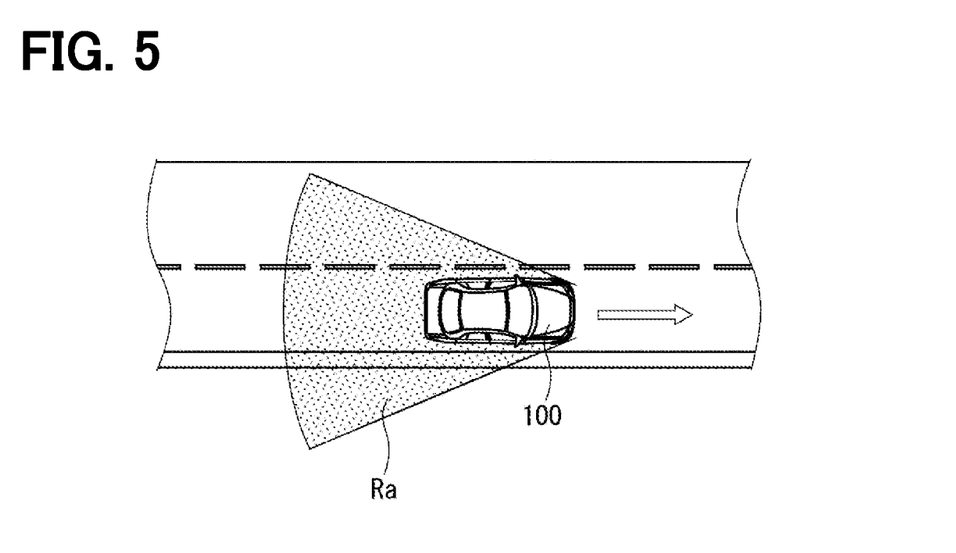
FIG. 5 is another diagram showing the proximity determination range according to the embodiment.

Further, as shown in FIG. 5, the proximity determination range Ra may be set as a predetermined angle range from a front end of the own vehicle 100 in consideration of the approach from a rear side of the own vehicle due to a lane change or the like. In such manner, the other vehicle 200 approaching from diagonally behind, for example, for merging or the like becomes detectable. In FIGS. 4 and 5, the proximity determination range Ra is shown by hatching.

Figure 6:
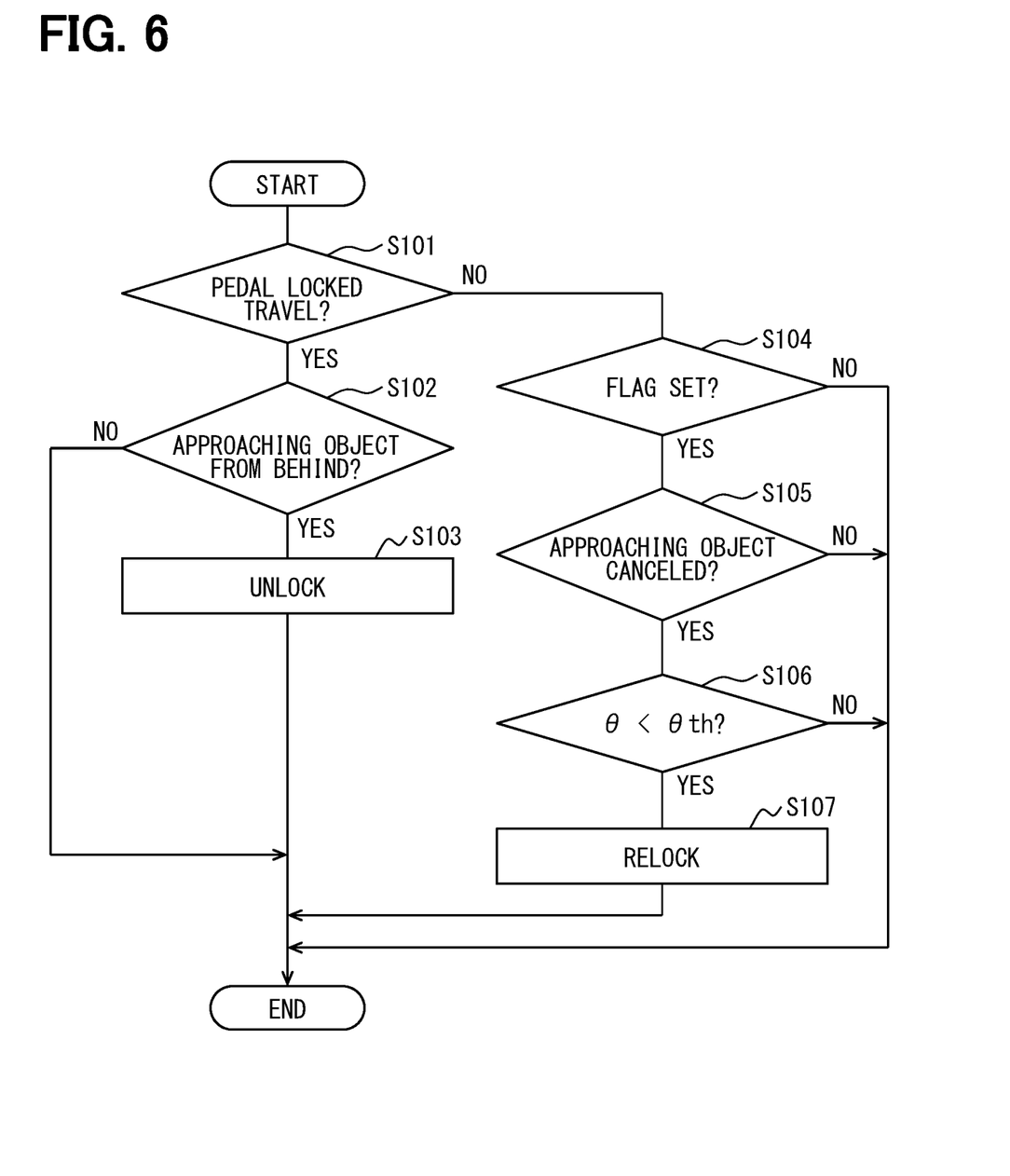
FIG. 6 is a flowchart showing a lock operation control process according to the embodiment.

A lock operation control process of the present embodiment will be described with reference to the flowchart of FIG. 6. Such a process is performed by the ECU 60 at a predetermined cycle. Hereinafter, the term "step" in a phrase such as step S101 is omitted, and is simply put as the symbol "S."

In S101, the ECU 60 determines whether or not the vehicle is traveling in a state where the pedal lever 20 is locked. Hereinafter, the traveling in the state where the pedal lever 20 is locked is referred to as a pedal locked travel. When it is determined not as a pedal locked travel (S101: NO), that is, when it is determined as a pedal unlocked travel, the process proceeds to S104. When it is determined as a pedal locked travel (S101: YES), the process proceeds to S102.

In S102, the lock operation determination unit 64 determines whether or not an approaching object from behind of the own vehicle has been detected based on the information from vehicle peripheral information acquisition unit 74. In the present embodiment, when a vehicle, an obstacle, or the like is detected in the proximity determination range Ra by a radar or a camera, a positive determination is made in S102.

Further, an approaching object from behind the own vehicle may be detected by vehicle-to-vehicle communication or road-to-vehicle communication. When it is determined that an approaching object from behind the own vehicle is not been detected (S102: NO), the process of S103 is skipped and the pedal locked travel is continued. When it is determined that an approaching object from behind the own vehicle is detected (S102: YES), a from-behind approaching object determination flag is set and the process proceeds to S103. In S103, the actuator control unit 65 drives the motor 41 to unlock the pedal lever 20.

In S104, which is subsequent to a determination that it is not a pedal locked travel (S101: NO), that is, when the pedal lever 20 is not locked, the lock operation determination unit 64 determines whether or not the from-behind approaching object determination flag is set. When it is determined that the from-behind approaching object determination flag is not set (S104: NO), the process of S105 and the following steps S106, S107 is skipped. When it is determined that the from-behind approaching object determination flag is set (S104: YES), the process proceeds to S105. For example, a positive determination may always be made within a predetermined time from a flag reset.

In S105, the lock operation determination unit 64 determines whether or not the detection of an approaching object from behind the own vehicle has been canceled. When it is determined that the detection of an approaching object from behind the own vehicle has not been canceled (S105: NO), the process of S106, S107 is skipped. When it is determined that the detection of an approaching object from behind the own vehicle has been canceled (S105: YES), the from-behind approaching object determination flag is reset and the process proceeds to S106.

In S106, the lock operation determination unit 64 determines whether or not the pedal opening degree θ is smaller than a predetermined opening degree θth. The predetermined opening degree θth is set to an arbitrary value smaller than an override opening degree. In the present embodiment, the predetermined opening degree θth is set at a value that is relatively close to the fully closed position. When it is determined that the pedal opening degree θ is equal to or greater than the predetermined opening degree θth (S106: NO), the process of S107 is skipped and the pedal unlocked travel is continued. When it is determined that the pedal opening degree θ is smaller than the predetermined opening degree θth (S106: YES), the process proceeds to S107. In S107, the actuator control unit 65 drives the motor 41 and relocks the pedal lever 20.

Figure 7:
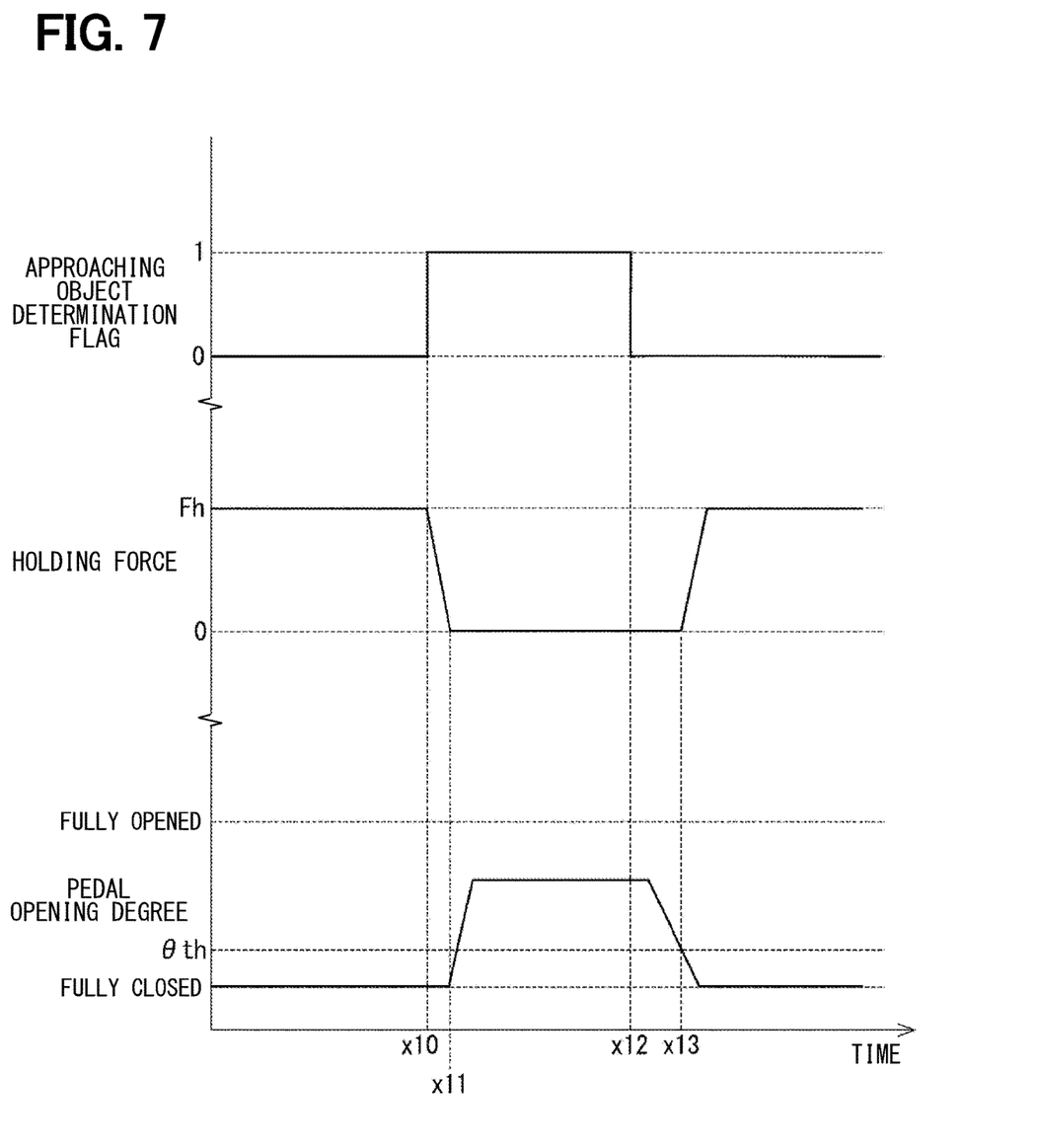
FIG. 7 is a time chart showing the lock operation control process according to the embodiment.
Figure 8:
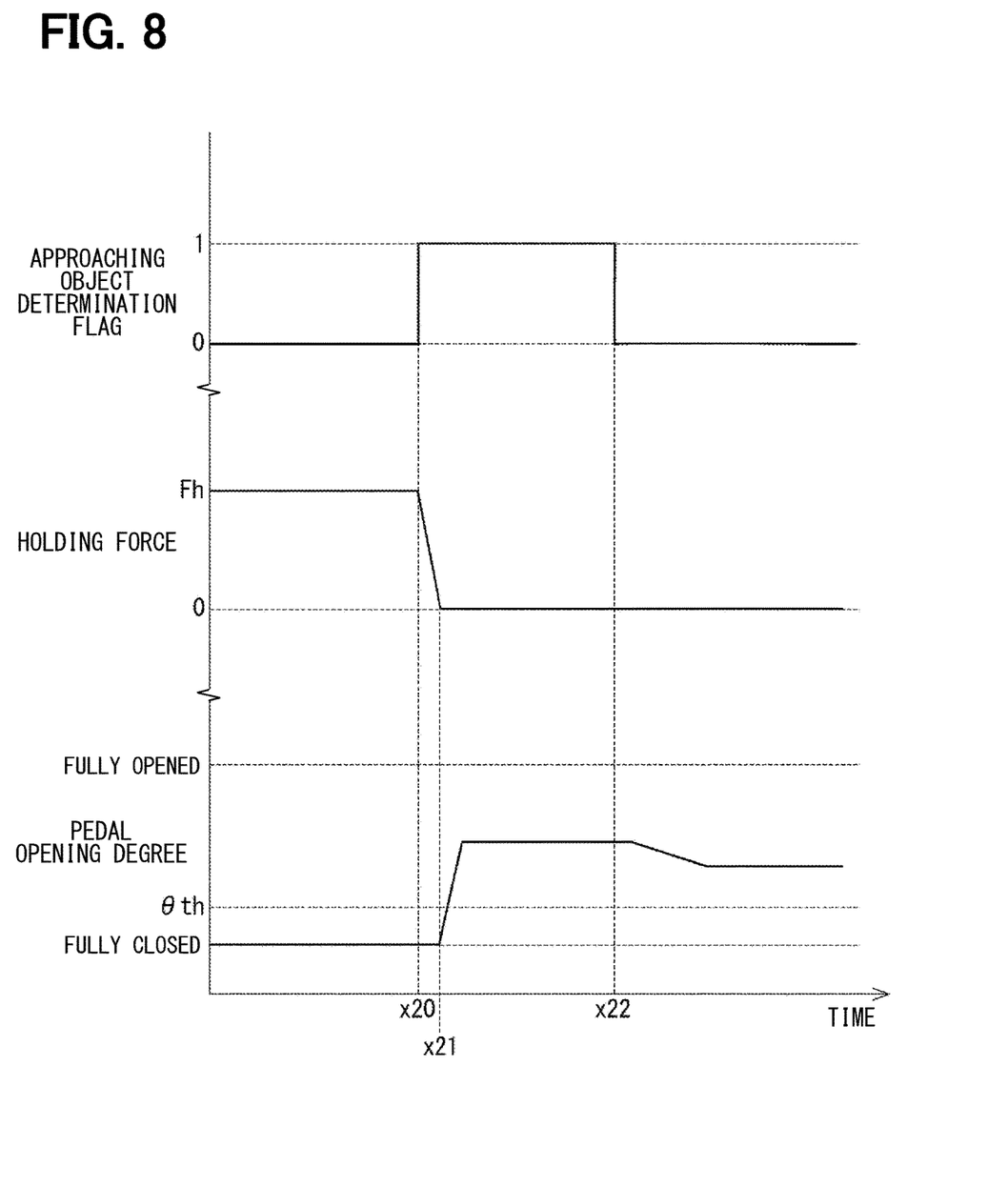
FIG. 8 is another time chart showing the lock operation control process according to the embodiment.

The lock operation control process of the present embodiment will be described with reference to the time charts of FIGS. 7 and 8. In FIGS. 7 and 8, a common time axis is set as a horizontal axis, and the from-behind approaching object determination flag (i.e., approaching object determination flag from behind), a lock holding force (holding force) for holding the pedal lever 20, and the pedal opening degree θ are indicated accordingly from top to bottom rows. In FIGS. 7 and 8, a set state in which the flag is set is represented as "1," and a reset state in which the flag is reset is represented as "0."

As shown in FIG. 7, before time x10, during the pedal locked travel, the pedal lever 20 is held in a locked state by a holding force Fh. When an approaching object from behind the own vehicle is detected at time x10 by the approaching object detection unit 69, the from-behind approaching object determination flag is set. Further, by driving the motor 41 so as to release the locked state of the pedal lever 20, the lock holding force is lowered. When the unlocking is complete at time x11, the driver can step on the pedal lever 20 with a normal pedaling force, thereby a rapid acceleration in response to the pedal opening degree θ is made possible.

At time x12, no approaching object on the rear side of the own vehicle is detected any more, and when the driver weakens the depression (stepping force) of the pedal lever 20, the pedal opening degree θ becomes smaller. When the pedal opening degree θ becomes smaller than the predetermined opening degree θth at time x13, the motor 41 is driven and the pedal lever 20 is relocked.

In FIG. 8, the process before time x22 is the same as the process before time x12 in FIG. 7. When the approaching object on the rear side of the own vehicle is no longer detected at time x22 and the pedal opening degree θ continues to be larger than the predetermined opening degree θth even after the from-behind approaching object determination flag is reset, the pedal unlocked travel is continued without locking the pedal lever 20.

In the present embodiment, when an approaching object is detected on the rear side of the own vehicle, the pedal lever 20 is unlocked, thereby a rapid acceleration is made possible. In such manner, a dangerous situation such as having an approaching other vehicle from behind the own vehicle is avoidable.

As described above, the accelerator pedal system 1 of the present embodiment includes the pedal lever 20, the lock mechanism 50, the actuator 40, and the ECU 60. The pedal lever 20 operates in accordance with a step-on operation. The operation of the pedal lever 20 can be restricted by the lock mechanism 50. Here, the expression "the operation of the pedal lever can be restricted" is not limited to setting the movement amount to 0 by completely fixing the pedal lever 20, but is a concept including setting the movement amount to be smaller than that in the unlocked state. The actuator 40 switches between a locked state in which the operation of the pedal lever 20 is restricted by the lock mechanism 50 and an unlocked state in which the operation thereof is not restricted.

The ECU 60 includes the lock operation determination unit 64, and the actuator control unit 65. The lock operation determination unit 64 determines switching of the lock operation by the lock mechanism 50. The actuator control unit 65 controls driving of the actuator 40 in accordance with the determination result of the lock operation determination unit 64. In the present embodiment, the driving of the motor 41 is mainly controlled so as to control the driving of the actuator 40.

The lock operation determination unit 64 unlocks the pedal lever 20 when an approaching object from behind the own vehicle is detected during a travel of the own vehicle in a pedal locked state. By unlocking the pedal lever 20 when an approaching object from behind the own vehicle is detected, it is possible to quickly accelerate by the manual operation according to the driver's depression of the pedal lever 20, i.e., by quickly switching from a steady travel such as ACC (Adaptive Cruise Control), for avoiding a dangerous situation.

After an approaching object is detected on the rear side of the own vehicle and the lock of the pedal lever 20 is released, on condition that (i) the approaching object on the rear side of the own vehicle is not detected, and (ii) the opening degree of the pedal lever 20 becomes smaller than the predetermined opening degree, the lock operation determining unit 64 relocks the pedal lever 20. In such manner, the pedal lever 20 is re-locked when the driver has no intention to accelerate, thereby a frequency of lock operations by the driver during driving is reducible, and the operation load of the driver is reducible.

Other Embodiments

In the above embodiments, the locking member 51 is provided on a fixed side, and the locked portion 52 is provided on a movable side. In other embodiments, the locking member may be provided on a movable side, and the locked portion may be provided on the fixed side. In the above embodiments, the locked portion is formed of a projection. In other embodiments, the locked portion may be formed of a recess. One of the locked portion and the locking member does not have to be provided on a spur gear, and may be provided on a member other than a spur gear that constitutes the power transmission mechanism.

In the above embodiments, the locking member is provided to be movable in a linear direction along the axial direction of the resilient member, which is a compression coil spring. In other embodiments, the locked state and the unlocked state may be switched by rotation of the locking member. When the state of locking is switched by rotation of the locking member, it is possible to reduce uneven wear of an abutting portion. In other embodiments, the resilient member does not have to be a compression coil spring, and may be a torsion spring, for example. Alternatively, the locking member itself may be formed of an elastic member such as rubber, and may be elastically deformed to switch the state of locking.

In addition, the power transmission mechanism and the lock mechanism may be different from those in the above embodiments. The shapes of the locking member and the locked portion may be different from those in the above embodiments, depending on component layout or the like. In the above embodiments, a common actuator is used to apply a reaction force to the pedal lever and to activate a locking operation. In other embodiments, an actuator for applying a reaction force and an actuator for activating a lock operation may be separately provided.

In the above embodiments, the lock mechanism can hold the locked state in a non-energized state where energization of the motor is turned off. In other embodiments, the lock mechanism may be configured to maintain the locked state by continuously energizing the motor.

In the above embodiments, the pedal lever is locked at the fully closed position by the lock mechanism. In other embodiments, the pedal lever may be locked at the fully opened position or may be locked at an intermediate position between the fully closed position and the fully opened position. Further, the pedal lever may be configured capable of being locked in a stepwise manner at a plurality of positions.

In the above embodiments, notification to the driver is performed at the time of lock activation and the time of lock releasing. In other embodiments, at least one of the notification at the time of lock activation and the notification at the time of lock releasing may be omitted. Whether to notify or not to notify may be changed depending on the situations. For example, a notification is performed immediately after the start of automatic driving, and a notification is not performed at the time of lock activation when an override is terminated during automatic driving. The same applies to whether to confirm or not to confirm the driver's intention related to lock activation and lock releasing.

According to an exemplar embodiment of the present disclosure, an accelerator pedal system for a vehicle includes a pedal lever configured to operate in accordance with a step-on operation; a lock mechanism configured to be capable of restricting the operation of the pedal lever; an actuator configured to switch between a locked state in which the operation of the pedal lever is restricted by the lock mechanism and an unlocked state in which the operation of the pedal lever is free from restriction by the lock mechanism; and a controller including at least one processor configured to determine switching of a locking operation by the lock mechanism, and to control a driving operation of the actuator. The controller is configured to detect an approaching object from behind the vehicle during a travel of the vehicle in the locked state of the pedal lever, and to release the locked state of the pedal lever in response to a detection of the approaching object from behind the vehicle during the travel of the vehicle.

A control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An accelerator pedal system for a vehicle, comprising:
    a pedal lever configured to operate in accordance with a step-on operation;
    a lock mechanism configured to restrict the operation of the pedal lever;
    an actuator configured to switch between a locked state in which the operation of the pedal lever is restricted by the lock mechanism and an unlocked state in which the operation of the pedal lever is free from restriction by the lock mechanism; and
    a controller including
        a lock operation determination unit configured to determine switching of a locking operation by the lock mechanism,
        an actuator control unit configured to control a driving operation of the actuator,
        an approaching object detection unit configured to detect an approaching object from behind the vehicle, and
        a pedal opening degree detector configured to detect an opening degree of the pedal lever,
    wherein the lock operation determination unit is configured to release the locked state of the pedal lever, when the approaching object detection unit detects the approaching object from behind the vehicle during a travel of the vehicle in the locked state of the pedal lever,
    the lock operation determination unit continues the unlocked state when the detected opening degree of the pedal lever is equal to or larger than a predetermined opening degree after releasing the locked state due to the approaching object from behind the vehicle, and
    the lock operation determination unit relocks the pedal lever after releasing the locked state due to the approaching object from behind, when (i) no approaching object from behind is detected by the approaching object detection unit and (ii) the detected opening degree of the pedal lever becomes smaller than the predetermined opening degree.

2. The accelerator pedal system according to claim 1, wherein the predetermined opening degree is closer to a fully closed position of the pedal lever than a fully opened position of the pedal lever.

3. An accelerator pedal system for a vehicle, comprising:
a pedal lever configured to operate in accordance with a step-on operation;
a lock mechanism configured to be capable of restricting the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including at least one processor configured to determine switching of a locking operation by the lock mechanism, and to control a driving operation of the actuator,
wherein the controller is configured
to detect an opening degree of the pedal lever,
to detect an approaching object from behind the vehicle during a travel of the vehicle in the locked state of the pedal lever,
to release the locked state of the pedal lever in response to a detection of the approaching object from behind the vehicle during the travel of the vehicle,
to continue the unlocked state when the detected opening degree of the pedal lever is equal to or larger than a predetermined opening degree after releasing the locked state due to the approaching object from behind the vehicle, and
to relock the pedal lever after releasing the locked state due to the approaching obiect from behind, when (i) no approaching object from behind is detected and (ii) the detected opening degree of the pedal lever becomes smaller than the predetermined opening degree.

4. The accelerator pedal system according to claim 3, wherein the predetermined opening degree is closer to a fully closed position of the pedal lever than a fully opened position of the pedal lever.

5. An accelerator pedal system for a vehicle, comprising:
a pedal lever configured to operate in accordance with a step-on operation;
a lock mechanism configured to restrict the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including
a lock operation determination unit configured to determine switching of a locking operation by the lock mechanism,
an actuator control unit configured to control a driving operation of the actuator,
an approaching object detection unit configured to detect an approaching object from behind the vehicle, and
wherein the lock operation determination unit is configured to automatically release the locked state of the pedal lever while maintaining an autonomous driving mode, when the approaching object detection unit detects the approaching object from behind the vehicle during a travel of the vehicle in the locked state of the pedal lever.

6. An accelerator pedal system for a vehicle, comprising:
a pedal lever configured to operate in accordance with a step-on operation;
a lock mechanism configured to restrict the operation of the pedal lever, the lock mechanism including a locking member and a biasing member, the biasing member biasing the locking member;
an actuator configured to switch between a locked state in which the operation of the pedal lever is restricted by the lock mechanism and an unlocked state in which the operation of the pedal lever is free from restriction by the lock mechanism; and
a controller including
a lock operation determination unit configured to determine switching of a locking operation by the lock mechanism,
an actuator control unit configured to control a driving operation of the actuator,
an approaching object detection unit configured to detect an approaching object from behind the vehicle, and
wherein the lock operation determination unit is configured to transition from the locked state to the unlocked state of the pedal lever, when the approaching object detection unit detects the approaching object from behind the vehicle during a travel of the vehicle in the locked state of the pedal lever, by driving the actuator to overcome a lock holding force defined by the biasing member of the lock mechanism.

7. The accelerator pedal system according to claim 6, wherein the controller is configured to maintain the unlocked state after transitioning from the locked state due to the approaching object from behind when a detected opening degree of the pedal lever is equal to or larger than a predetermined opening degree.

8. The accelerator pedal system according to claim 6, wherein the controller is configured to relock the pedal lever after releasing the locked state due to the approaching object from behind, when (i) no approaching object from behind is detected by the approaching object detection unit and (ii) a detected opening degree of the pedal lever is smaller than a predetermined opening degree.

9. An accelerator pedal system for a vehicle, comprising:
a pedal lever configured to operate in accordance with a step-on operation;
a lock mechanism configured to be capable of restricting the operation of the pedal lever, the lock mechanism including a locking member and a biasing member, the biasing member biasing the locking member;
an actuator configured to switch between a locked state in which the operation of the pedal lever is restricted by the lock mechanism and an unlocked state in which the operation of the pedal lever is free from restriction by the lock mechanism; and
a controller including at least one processor configured to determine switching of a locking operation by the lock mechanism, and to control a driving operation of the actuator,
wherein the controller is configured
to detect an approaching object from behind the vehicle during a travel of the vehicle in the locked state of the pedal lever,
to transition from the locked state to the unlocked state of the pedal lever in response to a detection of the approaching object from behind the vehicle during the travel of the vehicle by driving the actuator to overcome a lock holding force defined by the biasing element of the lock mechanism.

10. The accelerator pedal system according to claim 9, wherein the controller is configured to maintain the unlocked state after transitioning from the locked state due to the approaching object from behind when a detected opening degree of the pedal lever is equal to or larger than a predetermined opening degree.

11. The accelerator pedal system according to claim 9, wherein the controller is configured to relock the pedal lever after releasing the locked state due to the approaching object from behind, when (i) no approaching object from behind is detected by the approaching object detection unit and (ii) a detected opening degree of the pedal lever is smaller than a predetermined opening degree.

\* \* \* \* \*